United States Patent [19]

Uy

[11] 3,909,310

[45] Sept. 30, 1975

[54] APEX SEAL DESIGN

[75] Inventor: James C. Uy, Dearborn Heights, Mich.

[73] Assignee: Ford Motor Company, Dearborn, Mich.

[22] Filed: Sept. 5, 1974

[21] Appl. No.: 503,532

Related U.S. Application Data

[62] Division of Ser. No. 391,409, Aug. 24, 1973.

[52] U.S. Cl............. 148/11.5 R; 75/204; 75/248; 148/11.5 A; 148/11.5 F; 148/126; 418/179
[51] Int. Cl.² ................ C21D 9/00; F04C 27/00
[58] Field of Search.. 75/208, 204; 148/126, 11.5 F, 148/11.5 A, 11.5 R, 34; 277/235 R; 418/178, 179

[56] References Cited
UNITED STATES PATENTS

| | | | |
|---|---|---|---|
| 3,653,982 | 4/1972 | Prill | 148/31 |
| 3,658,604 | 4/1972 | Hale | 148/126 |
| 3,712,767 | 1/1973 | Beutter | 418/121 |
| 3,759,534 | 9/1973 | Sakamaki | 277/235 R |
| 3,830,601 | 8/1974 | Yamazaki | 418/178 |

*Primary Examiner*—C. Lovell
*Assistant Examiner*—Arthur J. Steiner
*Attorney, Agent, or Firm*—Joseph W. Malleck; Keith L. Zerschling

[57] ABSTRACT

A rotary internal combustion engine is disclosed having a rotor housing presenting an internal epitrochoid surface which is electrolytically coated with a composite of nickel and a carbide of silicon. A rotor piston is mounted for planetary movement within the rotor housing and carries a plurality of apex seal strips each comprised of a distinct wear-resistant portion and a distinct supporting portion. The wear-resistant portion is constituted of a sintered powder compact principally of iron and titanium carbide. The supporting portion is constituted of a sintered powder compact of high strength aluminum having a higher coefficient of thermal expansion than said wear-resistant portion. Both portions are mechanically keyed together to resist loads transverse to the strip and to make a mechanical joint as said portions differentially expand. The supporting portion is constituted of a material having a lower specific gravity than the wear-resistant portion; the wear-resistant portion has higher wear and antigalling properties as well as a lower dynamic coefficient of friction than the supporting portion.

4 Claims, 5 Drawing Figures

Metal Bonded
Carbide
Photomicrograph
(600x)

APEX SEAL DESIGN

This is a Division of application Ser. No. 391,409, filed Aug. 24, 1973.

BACKGROUND OF THE INVENTION

Various types of materials have been utilized for the apex seals typically carried by the triangular-shaped rotor of a rotary internal combustion engine. The seals have been preferentially formed by compacting metallic powders (principally cast iron or steel) followed by a sintering operation. To meet the severe rubbing problem of an apex seal, powdered aluminum with carbon, powdered iron with titanium carbide or powdered nickel with iron have been used as mixtures. Still other prior uses include that of hot pressed silicon nitride and tungsten carbide, and tool steel impregnated with graphite. In all cases where powdered mixtures have been used, they extend uniformly throughout the entire apex seal.

Each of the above materials have certain operating deficiencies. For example, powder compacted metallics are objectionable because of lower than desired wear-resistance and in some cases the expense of fabrication. Another example of an operating deficiency extending to all of the above materials is that which appears as chatter or a great number of lines which have been grooved or gouged out on the rotor housing surface as a result of direct contact by the seal strip. One or more revolutions produce a series of such transverse grooves which together appear microscopically as rather deep valleys and peaks along a specific zone of the rotor housing, usually in two locations each about 1/6 of the entire periphery. The differential height between the valleys and peaks of a severely chattered housing can be in the range of 50–350 mils. With such convolutions in the surface, the ability of the rotor seals to maintain gas-tight sealing becomes extremely difficult; lower efficiency for the engine results and premature failure of some of the engine components is prompted.

SUMMARY OF THE INVENTION

The primary object of this invention is to provide an improved construction for apex seal elements carried by a rotor of a rotary internal combustion engine, the construction having a composition compatible with compositions utilized on the rotor housing and against which a sliding engagement continuously takes place during each revolution of the rotor. The improved seal is capable of overcoming both the chatter and wear problems.

A more particular object of this invention is to provide a construction for an apex seal which is comprised of differential materials, one material constituting a supporting portion of the seal having light weight, high transverse strength at elevated temperatures, such as high strength aluminum. The wear-resistant portion of the construction consists of a material separately compacted from powders comprised of tool steel and titanium carbide. The portions are mechanically keyed together and are preferably fitted together with a heat shrink for additional adherence.

Another object of this invention is to combine the advantages of differential materials, one material exhibiting light weight and strength which contributes to overcoming the chatter problem resulting from inertial loads, and the other material being denser to provide wear-resistance and antigalling characteristcis, the materials not necessarily having a similar thermal expansion characteristic.

DETAILED DESCRIPTION

Figure 1:
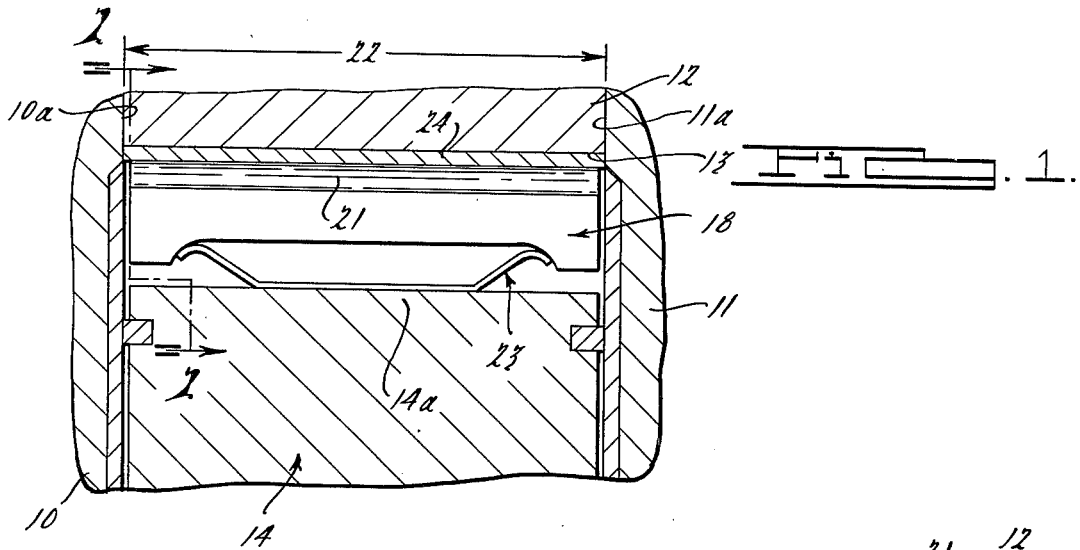
FIG. 1 is a fragmentary sectional view of a rotary engine showing the interengagement between an apex seal of this invention with a rotor and side housing.
Figure 2:
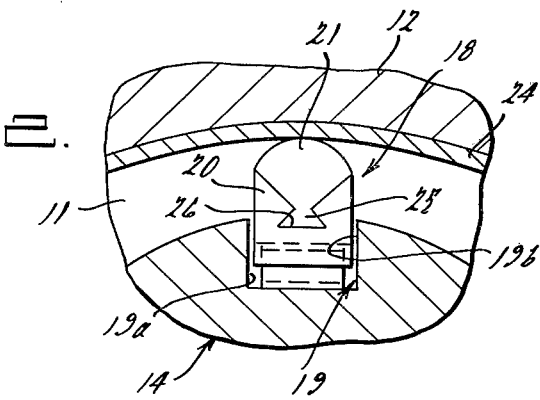
FIG. 2 is a sectional view taken substantially along line 2—2 of FIG. 1.
Figure 3:
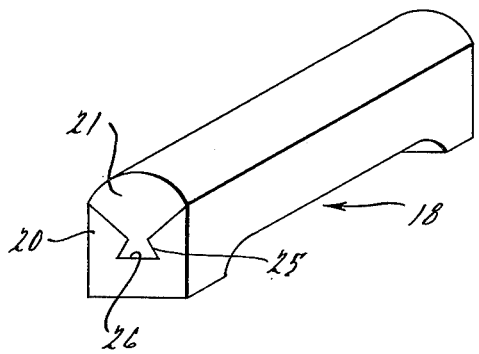
FIG. 3 is an enlarged perspective view of an apex seal embodying the features of this invention.
Figure 4:
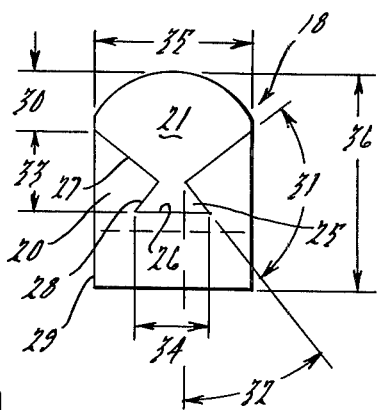
FIG. 4 is an enlarged end view of the structure shown in FIG. 3.
Figure 5:
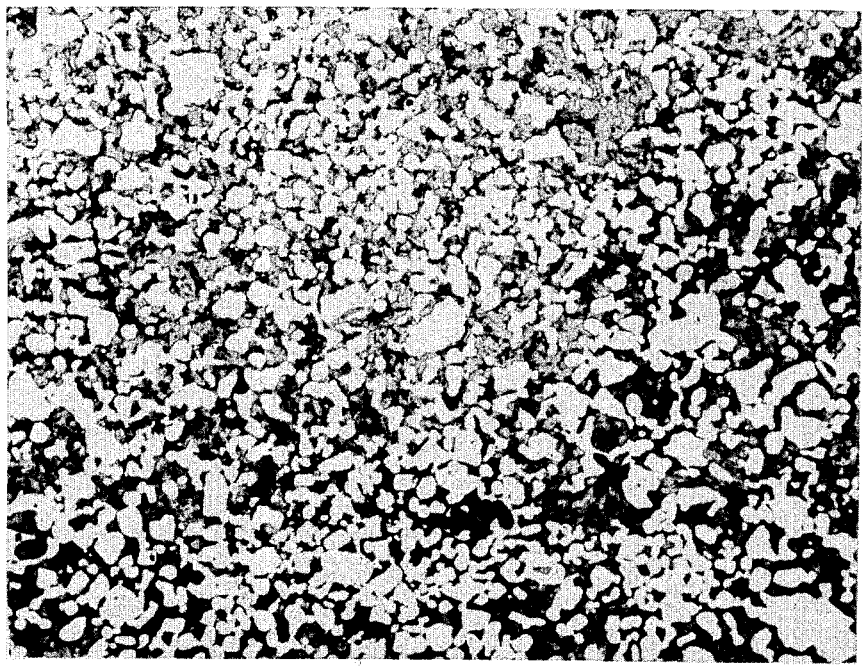
FIG. 5 is a microphotograph of the metallurgical structure of the wear-resistant material constituting one portion of the apex seal.

With reference to FIGS. 1 and 2, the rotary internal combustion engine has two side wall housings 10 and 11, each having spaced apart parallel side walls 10a and 11a respectively. A rotor housing 12 presents an inner peripheral wall 13 connecting said side walls. The peripheral wall 13 is epitrochoidally shaped and essentially comprises two lobes against which an eccentrically mounted rotor 14 may have an element carried by the apices 14a thereof in continuous sliding engagement. The apices of the rotor have apex seals 18 which complete the sliding engagement between the rotor and rotor housing wall 13 thereby dividing the space enclosed by the housings into a plurality of variable volume working chambers. Although not shown, the peripheral wall 13 of the rotor housing is provided with an intake port, an outlet port and a port for permitting the introduction of ignition means into the interior of the housings, whereby a complete four-stroke cycle can be performed within each working chamber during each revolution of the rotor.

For effective operation of the engine, the working chambers must be sealed. To this end, the apex seals 18 loosely fit within a slot 19 defined in each rotor apex 14a. Each seal has an elongated strip or slug which is comprised of a supporting portion 20 and a wear-resistant portion 21. Each of these portions extend substantially transversely across the width 22 of the rotor housing as well as the rotor. Each apex seal is urged both by gas pressure and by an auxiliary mechanical force (spring 23) to engage the epitrochoid surface 13 of the rotor housing throughout its operation. To do this continuously, the seal element must be moved laterally to engage a side of slot 19 for creating a seal. In one zone of planetary movement of the rotor, side 19a of the slot must be engaged; in another zone of planetary movement of the rotor, the seal element must shift to the other side 19b for creating a seal. Gas pressure promotes such shift. Similarly gas pressure assisted by the spring force is used to urge the seal element outwardly to engage surface 13. Since the seal is dependent upon a gas pressure, the seal element experiences inertial forces in certain zones of the epitrochoid path (usually not at the shift points) resulting in chatter. Furthermore, continuous contact between the apex seal and rotor housings, as well as between the ends of the apex seal and the side housing, require improvements in material chemistry to provide dry lubrication therebetween.

This invention contemplates constituting the apex seals 18 of two portions, each having differential characteristics. The supporting portion 20 is formed by powder compaction of an aluminum-based alloy having a typical weight analysis 5 percent copper, 0.62 percent silver, 0.29 percent titanium and the balance aluminum. The resulting supporting portion 20 has a specific gravity in the range of 2.7, no greater than 3.5, and a yield strength at 600°F of about 12,000 p.s.i. In contrast, the wear-resistant portion 21 is formed essentially from compacted tool steel and titanium carbide powders in the ratio of about 2:1. A typical analysis by weight would be iron 56 percent, titanium carbide 34.5 percent, chromium 6.7 percent, molybdenum 2.0 percent and carbon 0.8 percent. The tool steel can form approximately 40–90 percent by weight of the powder admixture and titanium carbide can form 10–60 percent by weight of the admixture. Each of the portions 20 and 21 are subjected to a sintering treatment following compaction to develop appropriate adhesion between the particles. The wear-resistant portion 21 has a specific gravity of about 4.6 and an excellent anti-galling characteristic. When properly heat treated as discussed later, the portion 21 has a hardness value of at least $R_c$ 68. Portion 21 is distortion-free.

The hardness and running dry lubrication of the wear-resistant portion 21 effectively operates well against a surface such as electrolytically deposited nickel with suspended abrasive particles which has been coated on an aluminum rotor housing to form a layer 24 (see FIG. 1 or 2). The material against which the apex seal of this invention contacts should have a hardness valve of at least 60 $R_c$. In any case the layer 24 must be compatible in rubbing characteristics to receive the wear-resistance portion 21 of this invention.

To promote a joint between the two portions of the apex seal 18 which will withstand the stresses of operation of the engine, each are provided with a key member 25 and 26 respectively, complimentary in shape to each other so that they may interfit and form a dovetail lock. It has been found to obtain an optimum mechanical key between the two portions, the dovetail should be defined with facing surfaces 27 and 28 on each side thereof having an included angle 31 of approximately 90°. In addition, at least one of the facing surfaces should form an angle 32 with a side 29 of the apex seal of about 30°. The height 30 of the crown of the wear-resistant portion should be dimensioned so that it is approximately one-third (25–50 percent) the height 33 of the supporting portion. Additionally, the mass of the wear-resistant portion should be in the ratio of about 1.3 relative to the mass of the supporting portion.

To provide additional assurance of a proper lock or union between the supporting and wear-resistant portions, a shrink fit may be utilized. To this end, the compacted portion should be heated to approximately 350°F and then keyed together. Upon cooling, a zero clearance is obtained.

When the composition of the wear-resistant portion 21 is comprised of tool steel and titanium carbide in substantial amounts, the coefficient of thermal expansion will approximate about $4.6$–$4.7 \times 10^{-6}$/in./in./°F. When the supporting portion 20 is comprised of substantillay aluminum, the thermal coefficient of expansion will be about $13 \times 10^{-6}$/in./in./°F. This wide difference of thermal expansion will be felt at high engine operating temperatures and accordingly, the dovetail interfit between the portions 20 and 21, should be a shrink fitted. There will be a slight amount of looseness experienced at high engine operating temperatures even with a shrink fit, but this is very helpful since the aluminum can then breathe and not bow or break by stressing the wear-resistant portion 21. A shrink fit may be promoted by heating the compacted supporting portion to approximately 350°F and then keying the portions together. Upon cooling, a zero clearance is obtained at ambient temperature conditions.

METHOD

Tool steel with bonded carbides, such as used in the wear-resistant portion 21, includes heat treatable ferrous alloys usually containing 45–55 percent by volume on a refractory carbide, such as titanium carbide, tungsten carbide and tungsten-titanium double carbide. These materials are powder metallurgical products and are manufactured by using conventional powdered metallurgical practices, such as wet-milling of raw material ingredient powders. The powders are compacted between 12–15 t.s.i., and vacuum sintered to full density. In the annealed condition, the composites can be machined. After hardening they have high hardness and high wear-resistance equivalent to cemented carbides and, depending upon the matrix alloy, excellent corrosion resistance.

A preferred method of fabricating the apex seal structure of this invention with tool steel bond carbides in one portion and aluminum in the other portion comprises the following principal steps:

a. preparing an admixture of metallic powders, the powders comprising by weight tool steel in the range of 40–90 percent and titanium carbide in the range of 10–60 percent.

b. compacting said admixture of tool steel and titanium carbide powders to define an elongated strip of material serving as a wear-resistant portion for said seal, said compaction defining a male key-shaped member along the extent thereof, c. subjecting the compacted wear-resistant portion to a sintering operation, d. subjecting the wear-resistant portion to an austenetizing treatment of 2000°F for 1 hour while the surface is protected and followed by a staged quench consisting of immersion in warm oil (to prevent cracking) and then in liquid nitrogen (−110°F), e. tempering the wear-resistant portion to obtain a hardness of 68–69 $R_c$, f. preparing an admixture of powder particles consisting of 5 percent copper and the rest substantially aluminum, g. compacting said admixture of aluminum and copper powders for defining a supporting portion in the form of an elongated strip of material having a female-shaped key member at one side thereof, h. subjecting said compacted supporting portion to a sintering operation, i. subjecting said supporting portion to a heat treatment consisting of solution treatment for 16 hours at 995°F, quench in cold water and heating for 5–20 hours at 310–370°F and then air cooled, j. interlocking said male and female key members to unitize said portions.

A resulting typical analysis of the wear-resistant portion would be 34.5 percent titanium carbide, 6.5 percent chromium, 2 percent molybdenum, 56 percent iron and about 0.8–1.0 percent carbon. The range of chromium is necessary to permit such wear-resistant portion to be used under conditions which experience thermal conditions exceeding 400°F.

Internal stresses of high magnitude may be developed in the wear-resistant portion which has undergone considerable machining after sintering. These stresses are relieved without change in the microstructure by austenitizng the material and then subjecting the material to a special double quench sequence developed the proper hardness response, proper tempering is very important. The matrix of this material, in the quenched state, is composed of martensite, undissolved alloy carbides and some retained austenite. Secondary hardening of this material occurs between 900° and 1000°F due to the transformation of the retained austenite to martensite. However, to obtain a proper tempering response, there must be a double tempering step: the material must be held at about 975°F for 1 hour, air cooled to room temperature, followed by retempering at 925°F for another hour and again air cooled.

The as-sintered compact and wear-resistant portion will have a surface roughness of approximately 200 r.m.s. To obtain a much finer surface finish in the range of 12–16 r.m.s., a finishing grind is usually applied before austenitizing and tempering.

I claim as my invention:

1. A method of fabricating a seal structure for use in a rotary internal combustion engine, the method comprising:
    a. preparing an admixture of metallic powders consisting of iron in the range of 40–65 percent titanium carbide in the range of 25–50 percent and about 10 percent of third elements selected from the group consisting of chromium and molybdenum,
    b. compacting said admixture of iron, titanium carbide, and third element powders to define an elongated strip of material serving as a wear-resistant portion for said seal,
    c. subjecting said compacted wear-resistant portion to a sintering operation,
    d. subjecting said wear-resistant portion to an austenitizing treatment and interruptingly quenching said portion, first in warm oil and then in liquid nitrogen to develop a transverse rupture strength of about 350,000 p.s.i.,
    e. preparing an admixture of powder particles consisting of aluminum in the range of 95–100 percent and copper in the range of 0–5 percent,
    f. compacting said admixture of aluminum and copper powders for defining a supporting portion,
    g. subjecting said compacted supporting portion to a sintering operation and
    h. interlocking said portions together to complete said seal structure.

2. The method as in claim 1, in which said wear-resistant portion is further subjected to a double tempering step to develop a hardness of at least $R_c68$, said portion being heated to about 975°F for about 1 hour and air cooled, then heated to about 950°F for about 1 hour and again air cooled.

3. The method as in claim 1, in which the wear-resistant portion is further processed by grinding to develop a surface finish of between 12–16 r.m.s.

4. The method as in claim 1, in which said supporting portion is further subjected to solution heat treatment of about 16 hours at about 995°F, quenched in cold water to about 60°F and then heat treated from 5–20 hrs. at between 310°–370°F.

* * * * *